(12) United States Patent  
Manimala

(10) Patent No.: US 8,702,347 B2  
(45) Date of Patent: Apr. 22, 2014

(54) DEVICE FOR PROTECTING A SUBSEA STRUCTURE AND METHODS RELATING TO SAME

(75) Inventor: Yesudas James Manimala, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 12/547,217

(22) Filed: Aug. 25, 2009

(65) Prior Publication Data

US 2010/0086363 A1 Apr. 8, 2010

Related U.S. Application Data

(60) Provisional application No. 61/103,529, filed on Oct. 7, 2008, provisional application No. 61/105,272, filed on Oct. 14, 2008.

(51) Int. Cl.
*F16L 57/00* (2006.01)

(52) U.S. Cl.
USPC .......................................................... 405/157

(58) Field of Classification Search
USPC .......... 405/211, 212, 216, 43–49, 157, 184.4; 138/105, 103; 174/95, 97, 100, 101, 174/481–482; 104/275
See application file for complete search history.

(56) References Cited

U.S. PATENT DOCUMENTS

| 3,733,831 | A | | 5/1973 | Sticker, Jr. |
| 3,910,056 | A | * | 10/1975 | Dopyera ........................ 405/211 |
| 4,014,369 | A | | 3/1977 | Kobres, Jr. |
| 4,171,174 | A | | 10/1979 | Larsen |
| 4,210,208 | A | | 7/1980 | Shanks |
| 4,273,472 | A | | 6/1981 | Piazza et al. |
| 4,469,468 | A | | 9/1984 | Larsen |

(Continued)

FOREIGN PATENT DOCUMENTS

| GB | 2 246 413 A | 1/1992 |
| GB | 2 263 752 B | 7/1995 |

(Continued)

OTHER PUBLICATIONS

PCT International Search Report and Written Opinion, International Application No. PCT/US2009/054930, dated Apr. 8, 2010, pp. 1-11.

(Continued)

*Primary Examiner* — Sunil Singh
(74) *Attorney, Agent, or Firm* — Nicholas F. Gallo; Melissa Patangia

(57) ABSTRACT

A device for protecting a subsea structure from damage due to impact from falling objects. The device includes a lower shell that can be positioned over the subsea structure on the sea bed. The lower shell has a non-articulating cross sectional shape that provides a conduit between the lower shell and the sea bed. An upper shell is fixed to an outer surface of the lower shell and has a cross sectional shape that provides a conduit between the outer surface of the lower shell and the upper shell. The upper shell is sized and configured to be disposed on the lower shell. The lower shell can include footings to providing bearing support on the sea bed or may be positioned on separate footings or foundation on the sea bed. Methods of making the device and using the device to protect subsea structures are also disclosed.

14 Claims, 3 Drawing Sheets

(56) References Cited

U.S. PATENT DOCUMENTS

| | | | |
|---|---|---|---|
| 4,477,206 A | 10/1984 | Papetti et al. | |
| 4,563,107 A | 1/1986 | Peterson | |
| 4,683,156 A | 7/1987 | Waters | |
| 4,793,737 A | 12/1988 | Shotbolt | |
| 4,919,210 A | 4/1990 | Schaefer, Jr. | |
| 5,099,889 A | 3/1992 | Ratzlaff | |
| 5,193,937 A | 3/1993 | Miller | |
| 5,785,454 A * | 7/1998 | Ringdal et al. | 405/45 |
| 6,068,027 A | 5/2000 | Miller | |
| 6,273,641 B1 | 8/2001 | Bull | |
| 6,417,457 B1 | 7/2002 | Aasbo et al. | |
| 6,602,023 B2 * | 8/2003 | Crescenzi et al. | 405/42 |
| 6,682,103 B1 | 1/2004 | Poirier | |
| 7,282,638 B2 | 10/2007 | Karlsen et al. | |
| 7,339,113 B2 | 3/2008 | Cavill | |
| 7,413,381 B1 * | 8/2008 | Bracone, Jr. | 405/45 |
| 2006/0243471 A1 * | 11/2006 | Karlsen et al. | 174/15.1 |
| 2009/0308631 A1 * | 12/2009 | Nelson et al. | 174/97 |

FOREIGN PATENT DOCUMENTS

| | | |
|---|---|---|
| GB | 2 365 941 A | 2/2002 |
| GB | 2 368 616 A | 5/2002 |
| GB | 2 346 424 B | 2/2003 |

OTHER PUBLICATIONS

FoundOcean, Home, found at http://www.seamarksystems.com/.
FoundOcean Concrete Mattresses & Structures, found at http://www.foundocean.com/home/products-and-services/concrete-mattresses-and-structures/.
FoundOcean Concrete Mattresses Pipeline Stabilisation, found at http://www.foundocean.com/webpac_content/home/products-and-services/concrete-mattresses-and-structures/FoundOcean%20Pipeline%20Stabilisation%20and%20Protection%20Brochure.pdf.
Pipeshield Products, found at http://www.pipeshield.co.uk/pipeshield_products.asp.
Pipeshield Concrete Protective Support Structures, found at http://www.pipeshield.co.uk/concrete_protective_structures.asp.
Pipeshield Fabric Formworks & Grout Bags, found at http://www.pipeshield.co.uk/fabric_formworks_grout_bags.asp.
Pipeshield Concrete Blankets & Mattresses, found at http://www.pipeshield.co.uk/concrete_blankets_mattresses.asp.
Pipeshield Marine & Inshore Protection Systems, found at http://www.pipeshield.co.uk/marine_inshore_protection_systems.asp.
Pipeshield Bitumen Blankets & Mattresses, found at http://www.pipeshield.co.uk/bitumen_blankets_mattresses.asp.
Pipeshield Steel Fabrications / Installation Equipment, found http://www.pipeshield.co.uk/steel_fabrications_installation_equipment.asp.
Pipeshield Field Joint Coatings, found at http://www.pipeshield.co.uk/field_joint_coatings.asp.
Pipeshield Special Products & Projects, found at http://www.pipeshield.co.uk/special_products_projects.asp.
Pro-Dive Marine Services Subsea Mattress, found at http://prodive.ca/subsea_mattress.htm.
The SLP Group Submat, found at http://www.slp-group.com/pages/view/submat.
The SLP Group Concrete Mattresses, found at http://www.slp-group.com/pages/view/concrete-mattressess.
The SLP Group Frond Flexiform Concrete Mattress, found at http://www.slp-group.com/app/webroot/js/tiny_mce/plugins/tinybrowser/useruploads/files/frond_flexiform.pdf.
The SLP Group Flexiform Revetment Mattresses, found at http://www.slp-group.com/app/webroot/js/tiny_mce/plugins/tinybrowser/useruploads/files/flexi_revet_matts.pdf.
The SLP Group Submat Flexiform, found at http://www.slp-group.com/app/webroot/js/tiny_mce/plugins/tinybrowser/useruploads/files/flexiform_mattress.pdf.
The SLP Group Submat Pipeform, found at http://www.slp-group.com/app/webroot/js/tiny_mce/plugins/tinybrowser/useruploads/files/submat_pipeform.pdf.
The SLP Group Flexible Concrete Mattresses in Stock, found at http://www.slp-group.com/app/webroot/js/tiny_mce/plugins/tinybrowser/useruploads/files/concrete_mattresses_in_stock.pdf.
Hudson, Advancements in Subsea Intervention and Construction Techniques for Dropped Object Protection, Pipeline Stabilisation and Grouting Related Activities, Energy Sources Technology Conference & Exhibition, ETCE98-4740, 1998, ASME.
Fog et al., South Arne-Nybro Offshore Pipeline, The Subsea Installations, Feb. 2001, vol. 123, No. 1, Journal of Offshore Mechanics and Arctic Engineering.
Knutsen et al., Aluminium Applied for Subsea Structures: Possibilities and Challenges, The Proceedings of The Eleventh (2001) International Offshore and Polar Engineering Conference, Jun. 2001, vol. 1, p. 46-52.
PCT International Search Report and Written Opinion, International Application No. PCT/US2009/054930, dated Apr. 21, 2011, pp. 1-6.

* cited by examiner

DEVICE FOR PROTECTING A SUBSEA STRUCTURE AND METHODS RELATING TO SAME

CROSS-REFERENCE TO RELATED APPLICATIONS

This application claims the benefit of U.S. Provisional Applications No. 61/103,529, filed Oct. 7, 2008 and No. 61/105,272, filed Oct. 14, 2008.

FIELD OF THE INVENTION

The present invention relates to the field of devices and methods for protecting underwater structures disposed on a sea bed. More particularly, the invention relates to a multi-shelled device for protecting pipelines and other subsea infrastructure as are used in the exploration and production of oil and gas at off-shore locations.

BACKGROUND OF THE INVENTION

In an offshore environment, there is always the possibility of damage occurring to subsea structures and equipment due to impact with an item that is intentionally towed or drifted in water or dropped overboard as well as with items that are accidentally dropped or lost from platforms or vessels. A variety of hard objects including anchors, anchor chains, construction lines, trawl boards, scaffolding, drill collars, pumps, valves and even whole containers can be lost overboard and can cause significant damage and disruption to operations if there is an impact with critical subsea infrastructure. A variety of devices and means have been devised to protect subsea structures from such impact damage. These devices include articulating mattresses that comprise concrete or similar elements joined together to allow relative articulation, hinged devices, protective covers and tunnels made of various materials including concrete, corrugated metals, plastics and composites, as well as coatings, sheets and sleeves that are laid or applied directly to a subsea structure. While conventional technologies may be suitable for protecting subsea structures from low energy impacts, there continues to be a need for a device and methods that will protect subsea structures from damage that would otherwise result from high energy impacts.

SUMMARY OF THE INVENTION

In one aspect, the invention provides a device for protecting a subsea structure disposed on the seabed. The device includes a lower shell that can be positioned on a seabed. The lower shell has a non-articulating cross sectional shape that provides a protected conduit between the lower shell and the sea bed. The device also includes an upper shell fixed to an outer surface of the lower shell. The upper shell has a cross sectional shape that provides a conduit between the outer surface of the lower shell and the upper shell. In some embodiments, the cross sectional shape of the upper shell can comprises an arch, and in such an embodiment, the upper shell can optionally include a portion of a pipe such as a half pipe. In some embodiments, the cross sectional shape of the lower shell can comprise an arch, and in such an embodiment, the lower shell can include a portion of a pipe such as a half pipe.

The device can optionally include one or more of a stiffener connected to a side of the lower shell and a stiffener connected to a side of the upper shell. The device can also optionally include a footing connected to an end of the lower shell for providing bearing support to the lower shell on the sea bed. When included, the footing can include a metal beam or plate. In some embodiments, both a stiffener and footing can be used with the stiffener connected to a side portion of the lower shell and the footing. In such an embodiment, an upper portion of the stiffener can further be connected to a side portion of the upper shell.

In a process aspect, the invention provides a method for making a protection device for a subsea structure. The method includes the steps of selecting an elongated lower shell having a first diameter and fixing an upper shell to an outer surface of the lower shell. The upper shell comprises a portion of a pipe having a second diameter with the first diameter of the lower shell being greater than or equal to the second diameter. The method can optionally include the step of fixing a footing to an end of the lower shell. The method can also include fixing a gusset to a side of the lower shell and the footing. Where a gusset is used, the method can also include fixing an upper portion of the gusset to a side of the upper shell.

In another process aspect, the invention provides a method for protecting a subsea structure. The method includes the steps of locating a subsea structure disposed on a sea bed and positioning a device as claimed herein, over a portion of the subsea structure. The device can be positioned on footings disposed on the sea bed adjacent the subsea structure or can be provided with footings attached to the lower shell of the device. The device can be positioned over the subsea structure by a diver or using a remotely operated vehicle. In some embodiments, the device is positioned over the subsea structure within 1000 meters of an off-shore platform. The subsea structure can include one or more of a pipeline, pipeline spool, riser spool, well head, pump, valve, umbilical, and umbilical termination assembly. In some embodiments, a plurality of devices as claimed herein will be positioned end to end over an elongated portion of the subsea structure.

BRIEF DESCRIPTION OF THE DRAWINGS

The invention may be understood by reference to the following description taken in conjunction with the accompanying drawings.

Figure 1:
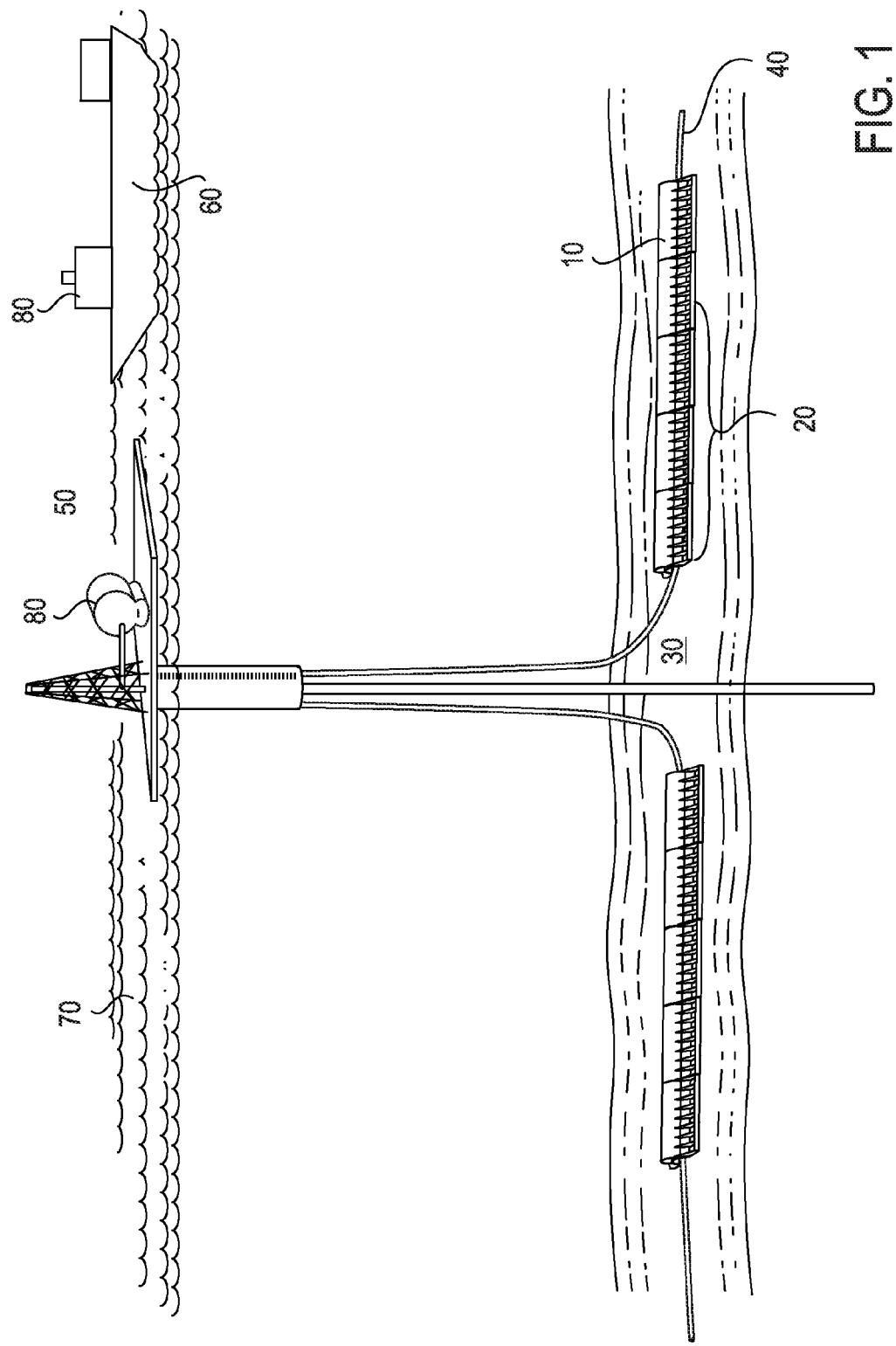
FIG. 1 is a schematic view showing a plurality of devices according to the present invention positioned over subsea pipelines for protecting portions of the pipelines adjacent an off-shore platform.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art having the benefit of this disclosure.

In the exploration and development of hydrocarbons at off-shore fields, critical equipment, pipelines and other infrastructure are commonly located on the sea bed below and in close proximity to various platforms, FPSOs (floating production, storage and offloading vessel) and other vessels. The present invention is directed to devices and methods for protecting such underwater infrastructure from damage that might otherwise result from a high energy impact with items that fall or are deployed from such a platform or vessel(s). In a first aspect, the invention provides a device for protecting a subsea structure that is disposed on the seabed. In a second aspect, the invention provides a method for making the protective device. In yet a third aspect, the invention provides a method of protecting a subsea structure using the protective device.

In a first aspect, the invention provides a device for protecting a subsea structure that is disposed on the seabed. The device comprises a lower shell having a non-articulating cross sectional shape that is open at one end for providing a protected conduit between the lower shell and the sea bed. The device is positioned so that the open end rests on the seabed over a subsea structure. The subsea structure can be located on and/or in the sea bed below the lower shell. The device further includes an upper shell that is fixed to an outer surface of the lower shell. The upper shell has a cross sectional shape that provides a conduit between the outer surface of the lower shell and the upper shell.

The upper and lower shells can be made of concrete, fiberglass, polymers, polymer composites, metals, and combinations thereof. In embodiments where the device is intended to be capable of sustaining a high energy impact, the shells can be constructed from high strength steel. More specifically, the upper and lower shells can be fabricated from rolled and welded steel plate. The thicknesses of the plate used can range considerably depending upon the application. In addition, the thickness of the respective shells need not be the same. For example, in an embodiment, where the device is intended to withstand impact energies of at least about 3 MJ, the upper shell can be fabricated from a steel plate having a thickness of at least about 0.75 inches. For embodiments where the device is intended to withstand greater impact energies, the thickness of the upper shell can be increased to about 1 inch or in some cases as much as about 1.25 inches. The energy of an impact with the device will primarily be absorbed by the upper shell, and as a result, the thickness of the lower shell will depend on the strength needed to adequately support the upper shell during impact. In an embodiment where the device is intended to withstand a about 5 MJ energy impact, the thickness of the plate used to fabricate the upper shell can be about 1.25 inches and the thickness of the plate used to fabricate the lower shell can be about 1 inch.

The dimensions of the lower shell will depend in large degree on the nature and configuration of the subsea structure to be protected and the marine conditions in which it will be deployed. Where the device is intended to protect an elongated structure such as a portion of a subsea pipeline, the lower shell can be elongated having a long axis. When positioned over the subsea pipeline, the long axis of the lower shell will be generally parallel to the pipeline. Because the upper shell is disposed on and fixed to the lower shell, the dimensions of the upper shell are generally the same or smaller than those of the lower shell. By way of example, the diameter of the lower shell will typically be equal to or greater than the diameter of the upper shell.

The cross sectional shape of the lower shell is open and can include an arch and portions of a circle, an ellipse, a hyperboloid, a paraboloid, regular polygons, irregular polygons and combinations of the same. In an embodiment where the device is intended to provide high impact resistance the cross sectional shape of the lower shell will typically comprise an arch. More specifically for such an embodiment, the lower shell can comprise a portion of a pipe, such as a half pipe. Although the term "half pipe" is used in this disclosure, it is intended that such references not be limited to precisely one half of a pipe, but will include any pipe or cylindrical structure that has had a portion cut away along its long axis. The cross sectional shape of the upper shell is closed by the outer surface of the lower shell to which it is fixed. The cross sectional shape can include an arch, a circle, an ellipse, a hyperboloid, a paraboloid, regular polygons, irregular polygons and combinations of the same. In an embodiment where the device is intended to provide high impact resistance the cross sectional shape of the upper shell will typically comprise an arch. More specifically for such an embodiment, the upper shell can comprise a portion of a pipe, such as a half pipe.

The device can include one or more optional footings connected to the ends of the lower shell. Footings, if present, are intended to provide bearing capacity to the lower shell so that it does not sink into the sea bed when positioned over a subsea structure. The design, material and construction of the footings will depend on the application of the device, the nature of the subsea structure to be protected and the characteristics of the sea bed. For applications where the device is intended to be capable of sustaining a high energy impact, the footings can include a metal beam or plate that is welded to a lower end or edge of the lower shell. In some embodiments, a footing will not be connected to the lower shell but will be a separate element that is not fixed to the device. For example, a mud mat, skirt or other foundational element may be associated with the subsea structure on which the lower shell can be positioned and supported.

A stiffener or stiffening element may be connected to the side walls or a side portion of each of the lower shell and the upper shell. For example, one or more stiffeners in the form of a gusset plate or flange can be connected to the side portion of the lower shell for reinforcing the lower shell. Where the lower shell has a footing attached to its lower end, the stiffener can be fixed to both the side portion of the lower shell and the upper surface of the footing. For applications where the device intended to be capable of sustaining a high energy impact, the stiffener can be a steel gusset plate that is welded to both the side portion of the lower shell and the upper surface of the footing. The stiffener can be sized and configured so as to connect with the side portion of the lower shell and a side portion of the upper shell. Alternative stiffeners or stiffening elements can include an internal flange or plate that is connected or welded along an inner surface of the lower and/or upper shells.

The device can further include means for interconnecting two or more devices in series in end to end arrangement such as where an extended portion or segment of a pipeline is to be protected. In such an embodiment, two or more devices can be secured to one another by hooks, bolts, screws, welding and the like.

In a process aspect, the invention provides a method for making the described protective device. The method comprises the step of selecting an elongated lower shell having a first diameter and fixing an upper shell to an outer surface of the lower shell. The upper shell comprises a portion of a pipe having a second diameter, wherein the first diameter is greater than or equal to the second diameter. As described, the design, size, dimensions and construction of the lower shell will be selected based on the structure to be protected, the anticipated conditions, and the desired impact resistance of the device. Optionally, a footing can be fixed to an end of the lower shell. Similarly, a gusset plate can optionally be fixed to a side portion of the lower shell and the footing to strengthen the device. The gusset plate can be selected to have an upper portion that can be fixed to a side portion of the upper shell. Where the device is intended to provide high impact resistance, the upper and lower shells, gussets and footings can comprise high strength steel and the various components are welded together.

In another process aspect, the invention provides a method for protecting a subsea structure. The method comprises the steps of locating a subsea structure disposed on a sea bed, and positioning a device as described herein, over a portion of the subsea structure. The device can be positioned onto footings, a skirt or other foundational elements that are located on the sea bed adjacent the subsea structure. The device can be positioned over the subsea structure by a diver or by a remotely operated vehicle, depending on the marine conditions and in particular the water depth. The device will be positioned over the subsea structure, generally within 1000 meters of an off-shore platform or FPSO vessel. In some embodiments, the device or a plurality of such devices will be located within 500 meters of the platform or vessel, and in others within 250 meters. The subsea structure that is protected by a device of the invention can comprise one or more of a pipeline, pipeline spool, riser spool, well head, pump, valve, umbilical, and umbilical termination assembly. Where the structure to be protected is elongated, the method can further comprise positioning a plurality of two or more devices as described herein, end to end over an elongated portion or segment of the subsea structure.

DETAILED DESCRIPTION OF THE FIGURES

FIG. 1 is a schematic view showing a plurality 20 of devices 10 positioned over subsea pipelines 40 for protecting the pipelines adjacent off-shore platform 50. The pipeline is shown to be in communication with drilling operations on platform 50, which although illustrated as a floating spar, should not be considered as limiting of the invention. Equipment 80 is shown on platform 50 and on supply vessel 60. Equipment 80 and other objects can be lost overboard which would then fall from sea level 70 to sea bed 30. Device 10, used in the vicinity of platform 50, protects pipeline 40 from damage that would otherwise occur due to the impact of such falling objects.

Figure 2:
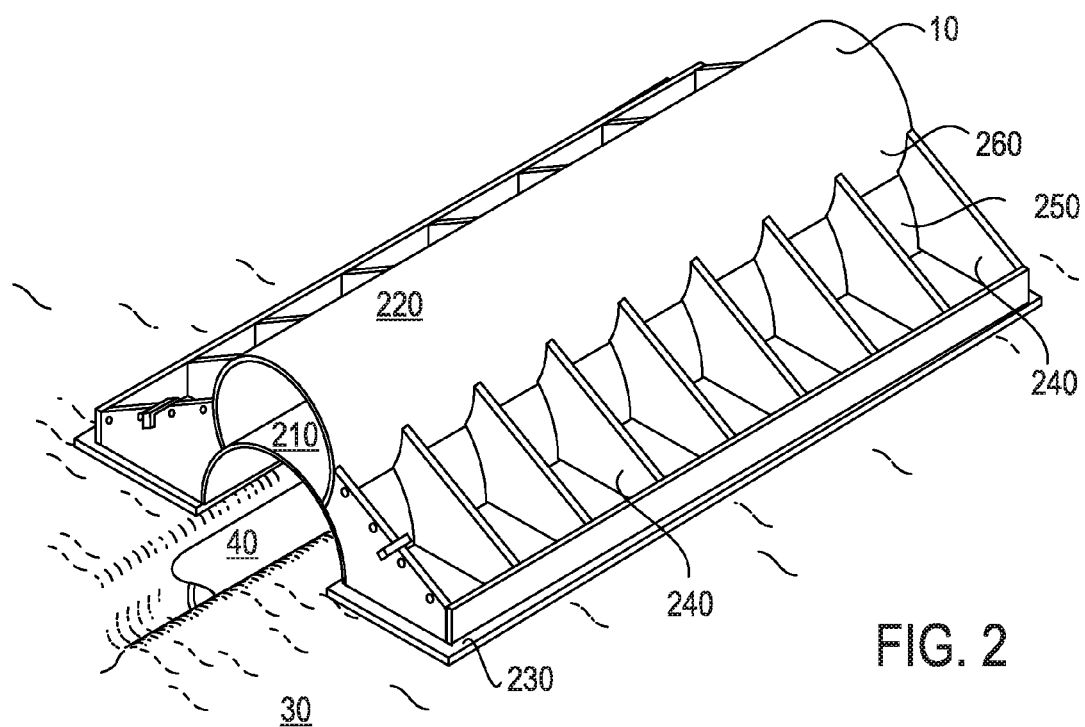
FIG. 2 is a perspective view of a device of the present invention.
Figure 3:
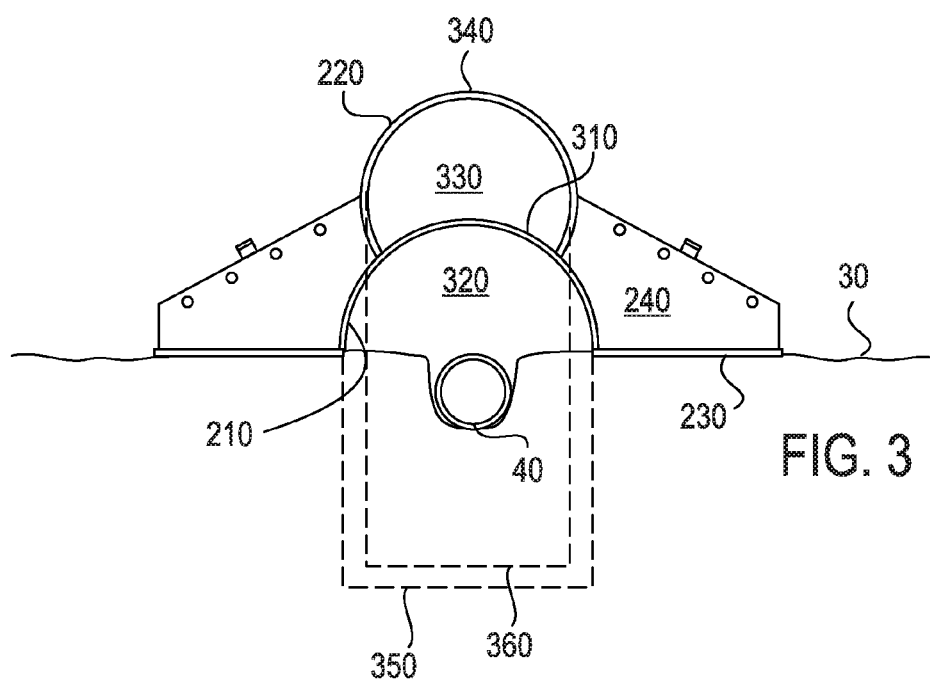
FIG. 3 is an end view of the device illustrated in FIG. 2.

FIG. 2 is a perspective view of device 10 that is positioned over a segment of subsea pipeline 40. Device 10 includes lower shell 210, a steel half pipe having an outer diameter of approximately 72 inches that rests on footings 230. Footings 230 are steel plates welded to the ends of the lower shell 210 and increase the bearing support for the device on sea bed 30. As seen in FIG. 3, subsea pipeline 40 is housed underneath the lower shell within protected conduit 320 that is provided between lower shell 210 and sea bed 30.

As shown in FIG. 3, an upper shell 220 is welded along outer surface 310 of lower shell 210. Upper shell 220 is a steel half pipe having an outer diameter of approximately 60 inches. Lower shell 210 has diameter 350 and upper shell 220 has smaller diameter 360. When upper shell 220 is fixed to the lower shell 210, conduit 330 is provided there between.

A plurality of gusset plates 240 are welded to the upper surface of footings 230 and to the side 250 of lower shell 210 and to a portion of side 260 of upper shell 220. The gussets serve as stiffeners to strengthen the device against collapse due to the impact from a falling object. Also shown in FIG. 3 are clips 370 and openings 380 that can be used to attach two devices 10 together in an end to end configuration.

Figure 4:
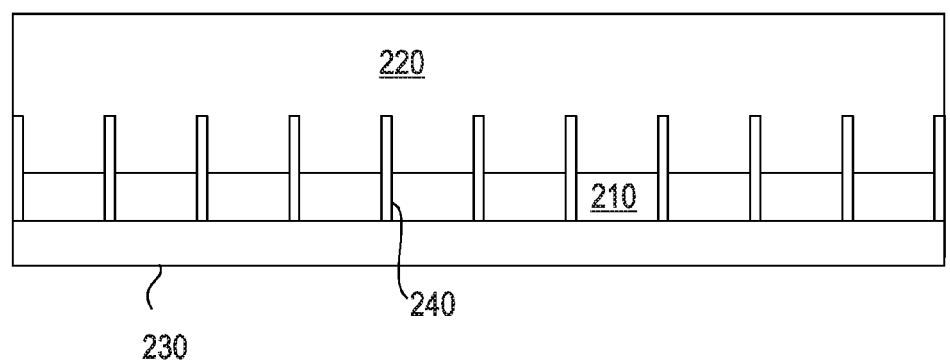
FIG. 4 is a side view of a device of the present invention.

FIG. 4 is a side view of a protection device 10 illustrating the configuration of lower shell 210, upper shell 220, footings 230 and stiffeners 240.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A device for protecting a subsea structure disposed on the seabed, the device comprising:
   a lower shell for positioning on a seabed, the lower shell having a non-articulating cross sectional shape that provides a conduit between the lower shell and the sea bed; and
   an upper shell fixed to an outer surface of the lower shell, the upper shell having a cross sectional shape that provides a conduit between the outer surface of the lower shell and the upper shell;
   a footings connected to an end of the lower shell for providing bearing support to the lower shell on the sea bed; and
   a stiffener connected to a side portion of the lower shell and the footings, wherein a portion of the stiffener is connected to a side portion of the upper shell.

2. The device of claim 1, wherein the footings comprise a metal beam or plate.

3. A method for protecting a subsea structure, the method comprising the steps of:
   locating a subsea structure disposed on a sea bed; and
   positioning a device according to any one of claims 1-2 over a portion of the subsea structure.

4. The method of claim 3, wherein the device is positioned onto footings disposed on the sea bed adjacent the subsea structure.

5. The method of claim 3, wherein the device is positioned over the subsea structure by a diver or by a remotely operated vehicle.

6. The method of claim 3, wherein the device is positioned over the subsea structure within 1000 meters of an off-shore platform.

7. The method of claim 3, wherein the subsea structure comprises one or more of a pipeline, pipeline spool, riser spool, well head, pump, valve, umbilical, and umbilical termination assembly.

8. A method for protecting a subsea structure, the method comprising the steps of:
   locating a subsea structure disposed on a sea bed; and
   positioning a device for protecting a subsea structure disposed on the seabed over a portion of the subsea structure, the device comprising:
      a lower shell for positioning on a seabed, the lower shell having a non-articulating cross sectional shape that provides a conduit between the lower shell and the sea bed; an upper shell fixed to an outer surface of the lower shell, the upper shell having a cross sectional shape that provides a conduit between the outer surface of the lower shell and the upper shell; and a stiffener connected to a side portion of the upper shell wherein the device is positioned onto footings disposed on the sea bed adjacent the subsea structure.

9. The method of claim 8, wherein the device further comprises the stiffener connected to a side portion of the lower shell.

10. The method of claim 8, wherein the upper shell is fabricated from a steel plate having a thickness of at least about 0.75 inches.

11. The method of claim 8, wherein the cross sectional shape of the upper shell comprises an arch.

12. The method of claim 11, wherein the upper shell comprises a portion of a pipe.

13. The method of claim 8, wherein the upper shell includes a half pipe.

14. The method of claim 8, wherein the lower shell includes a half pipe.

* * * * *